June 10, 1924.

P. P. COOPER

LOCOMOTIVE CAB CONSTRUCTION

Filed July 15, 1920

1,497,431

WITNESSES:
J. A. Helsel.
F. A. Lind.

INVENTOR
Peter P. Cooper.
BY
Wesley G. Carr
ATTORNEY

Patented June 10, 1924.

1,497,431

UNITED STATES PATENT OFFICE.

PETER P. COOPER, OF PHILADELPHIA, PENNSYLVANIA, ASSIGNOR TO WESTINGHOUSE ELECTRIC & MANUFACTURING COMPANY, A CORPORATION OF PENNSYLVANIA.

LOCOMOTIVE-CAB CONSTRUCTION.

Application filed July 15, 1920. Serial No. 396,409.

*To all whom it may concern:*

Be it known that I, PETER P. COOPER, a citizen of the United States, and a resident of Philadelphia, in the county of Philadelphia and State of Pennsylvania, have invented a new and useful Improvement in Locomotive-Cab Construction, of which the following is a specification.

My invention relates to vehicle bodies, particularly locomotive cabs, and it has particular relation to a type of construction especially adapted for the manufacture of cabs of the character indicated from standard structural steel parts.

Figure 1:
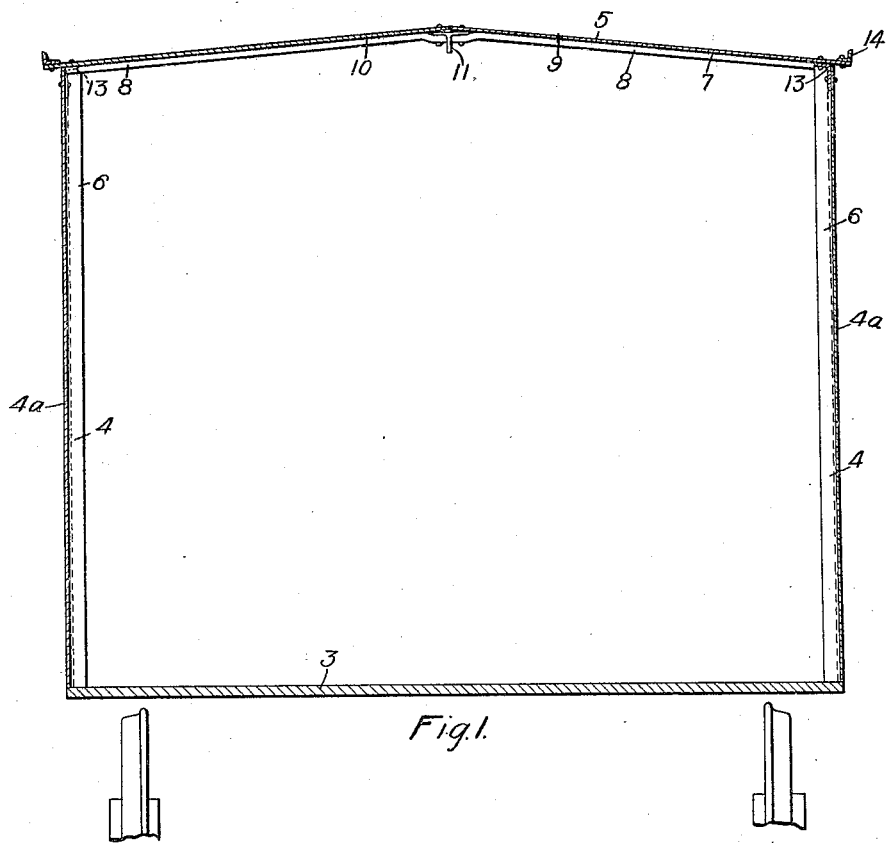

In the accompanying drawings, Figure 1 is a transverse-sectional view of a locomotive cab embodying my invention, the apparatus therein not being shown for the sake of clearness.

Figure 2:
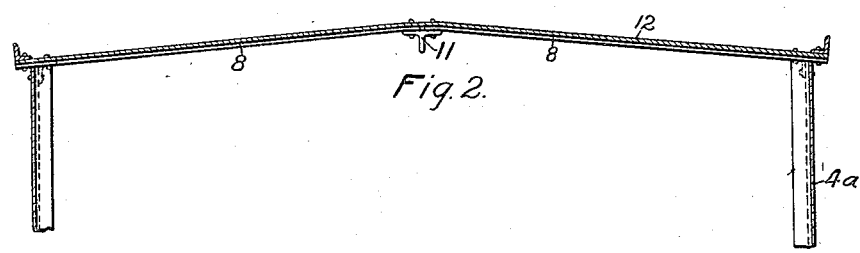

Fig. 2 is a detail view of the top portion of a vehicle cab illustrating another form of my invention.

Hitherto, it has been customary to construct locomotive cabs from steel bars and plates rolled to the desired shape and riveted together. By my invention, the entire cab is constructed of standard parts, eliminating the necessity of rolling or otherwise shaping any of the structural steel parts.

For a better understanding of my invention, reference may now be had to the drawings in Fig. 1 of which I show a vehicle cab consisting of a floor 3, walls 4, and a roof 5. The walls consist of a plurality of straight, flat sheets of steel 4ª supported at intervals by vertically disposed spaced angle bars 6. The roof 5 consists of a plurality of straight sheets of steel 7 re-inforced by spaced supporting bars 8. The roof 7 may consist of two short plates 9 and 10 connected together by means of a T-bar 11, which extends the length of the cab, as shown in Fig. 1. In the other form of my invention, as shown in Fig. 2, the supports 8 may consist of two bars attached together in end-to-end relation by means of the T-bar 11 and attached to a single relatively long sheet of metal 12, which is bent to conform to the shape of the roof and extends from one side of the cab to the other.

The roof is fastened to the sides of the cab by means of angle bars 13 which extend the length of the cab, and are riveted to the roof sheets 7, and to the side sheets 4ª, at their point of junction. The angle bars 6 and the supports 8 may be cut away to permit positioning the angle bar 13 as desired. The roof sheets 7 or 12, as the case may be, project beyond the top edge of the side sheets 4ª and are protected at their outer edge by means of an angle iron 14, riveted thereto, which serves as a gutter for rain, and which also serves to re-inforce the roof sheet 7.

From the foregoing description of my invention, it will be apparent to those skilled in the art that by its use the cabs of either cars or locomotives may be constructed entirely from standard structural steel parts, the advantage of which is obvious. Another advantage obtained by the use of the particular type of construction described is that it produces a cab with corners at the top which increases slightly the amount of head space in the cab and which permits raising the windows thereof to a much greater height than does the now common curved edge cab.

While I have shown several forms of my invention, and have described in detail but a single application of the same, it will be obvious to those skilled in the art that it is not so limited, but that various minor modifications and changes may be made therein without departing from the spirit thereof, and I desire, therefore, that only such limitations shall be imposed thereon as are set forth in the appended claims.

I claim as my invention:

1. A vehicle body composed of structural steel parts comprising side sheets, flat top sheets disposed transversely of the vehicle. T-bars secured to adjoining edges of the top sheets, and angle bars secured to the top sheets and the side sheets at their lines of juncture.

2. A vehicle body composed of structural steel parts comprising side sheets, top sheets disposed transversely of the side sheets, T-bars secured at the adjoining edges of said top sheets, angle bars secured to the adjoining edges of said side sheets and angle bars secured to the top and side sheets at their lines of juncture.

In testimony whereof, I have hereunto subscribed my name this first day of July, 1920.

PETER P. COOPER.